(12) United States Patent
Hsu et al.

(10) Patent No.: US 7,532,161 B2
(45) Date of Patent: May 12, 2009

(54) METHOD AND APPARATUS FOR WIDE AREA AUGMENTATION SYSTEM HAVING L1/L5 BIAS ESTIMATION

(75) Inventors: Po-Hsin Hsu, Irvine, CA (US); Laura A. Cheung, Pasadena, CA (US); Mohinder S. Grewal, Anaheim Hills, CA (US)

(73) Assignee: Raytheon Company, Waltham, MA (US)

( * ) Notice: Subject to any disclaimer, the term of this patent is extended or adjusted under 35 U.S.C. 154(b) by 431 days.

(21) Appl. No.: 11/232,575

(22) Filed: Sep. 22, 2005

(65) Prior Publication Data

US 2007/0067073 A1  Mar. 22, 2007

(51) Int. Cl.
*H04B 7/185* (2006.01)
*G01S 5/14* (2006.01)

(52) U.S. Cl. .................................. 342/358; 342/357.03
(58) Field of Classification Search .................. 342/358, 342/357.03
See application file for complete search history.

(56) References Cited

U.S. PATENT DOCUMENTS

| | | | |
|---|---|---|---|
| 5,867,411 | A | 2/1999 | Kumar |
| 6,040,798 | A | 3/2000 | Kinal et al. |
| 6,324,474 | B1 * | 11/2001 | Beisner et al. ......... 342/357.01 |
| 2005/0190102 | A1 | 9/2005 | Hsu et al. |

FOREIGN PATENT DOCUMENTS

| WO | WO 99/18677 | 4/1999 |
|---|---|---|
| WO | WO99/18677 A | 4/1999 |

OTHER PUBLICATIONS

Po-Hsin Hsu and Thomas W. Plummer, A New Algorithm For WAAS GEO Uplink Subsystem (GUS) Clock Steering, Sep. 9-12, 2003, pp. 1-9, California State University, Fullerton, California.

Shau-Shiun Jan, Analysis of a Three-Frequency GPS/WAAS Receiver to Land an Airplane, pp. 1-11, Department of Aeronautics and Astronautics Stanford University, California 94305.

(Continued)

*Primary Examiner*—Thomas H Tarcza
*Assistant Examiner*—Fred H Mull
(74) *Attorney, Agent, or Firm*—Daly, Crowley Mofford & Durkee

(57) ABSTRACT

Methods and apparatus for receiving an estimate of L1 iono delay and L1 iono delay rate, receiving GEO slant ionospheric delay, receiving user iono vertical error information for a GEO satellite, and computing a L1/L5 bias estimate from the estimate of L1 iono delay and L1 iono delay rate and GEO slant ionsperic delay. A wide area augmentation system (WAAS) includes L1/L5 bias estimation. The L1/L5 bias is the differential bias between the WAAS GEO satellite L1 and L5 signals. The data used in the L1/L5 bias estimation include the GEO L1 ionospheric delay estimated from a Kalman filter, and the GEO slant ionospheric delay calculated from the Ionospheric Grid Point (IGP) information in a WAAS message. The Sigma User Ionospheric Vertical Error (UIVE) is used as one of the conditions for performing the L1/L5 bias estimation.

18 Claims, 5 Drawing Sheets

OTHER PUBLICATIONS

Po-Hsin Hsu, Alternate Clock Steering Prototype Testing Activities in Jan. and Feb. 2001, Feb. 20, 2001, pp. 1-35, Raytheon Company, Waltham, Massachusetts.

Alan G. Evans, Robert W. Hill, Geoffrey Blewitt, Evertt R. Swift, Thomas P. Yunck, Ron Hatch, Stephen M. Lichten, Stephen Malys, John Bossler, James P. Cunningham. The Global Positioning System Geodesy Odyssey, Spring, 2002, pp. 1-28, Journal of the Inst. of Navigation, vol. 49(1), 7-34.

Dr. A. J. Van Dierendonck, AJ Systems, Planned GPS Civil Signals and Their Benefits to the Civil Community.

RTCA, Inc., Minimum Operational Performance Standards For Global Positioning System/Wide Area Augmentation System Airborne Equipment, Nov. 28, 2001.

M.S. Grewal, W. Brown, R. Lucy, P. Hsu, Geo Uplink Subsystem (GUS) Clock Steering Algorithms Performance, Validation, and Test Results, 1999, pp. 173-180.

William J. Klepczynski, The Role of Time and Frequency In The Wide Area Augmentation System (WAAS), 1998, pp. 235-240.

PCT/US2005/006094 PCT International Search Report dated Aug. 16, 2005.

Notification of transmittal of the International Search Report and the Written Opinion of the International Searching Authority, or the Declaration. (Form PCT/ISA/220).

International Search Report. (Form PCT/ISA/210).

Written Opinion of the International Searching Authority. (Form PCT/ISA/237).

Hsu, et al. Prototype Test Results of L1/L5 Signals of Future GEO Satellites, XP-002409386, ION GNSS 17th Int'l Tech Meeting of the Satellite Div., INST of Nav, Washington, DC, Sep. 21, 2004, pp. 1359-1366.

Cormier, et al. "Concept for New SBAS Message Types to Improve Give Resolution", XP-002418990, ION NTM Jan. 24-26, 2005, pp. 1140-1147.

Todd Walter, WAAS Mops: Practical Examples, pp. 1-11, Stanford University, California, 1999.

Wide Area Augmentation System, Geostationary Communication and Control Segment (GCCS) Specification, Mar. 15, 2002, pp. 1-75.

Deihim Hashemi, Daniel O'Loughlin, Extending Wide Area Augmentation System Service into Central and South America, Apr. 29, 2004, 33 pages.

* cited by examiner

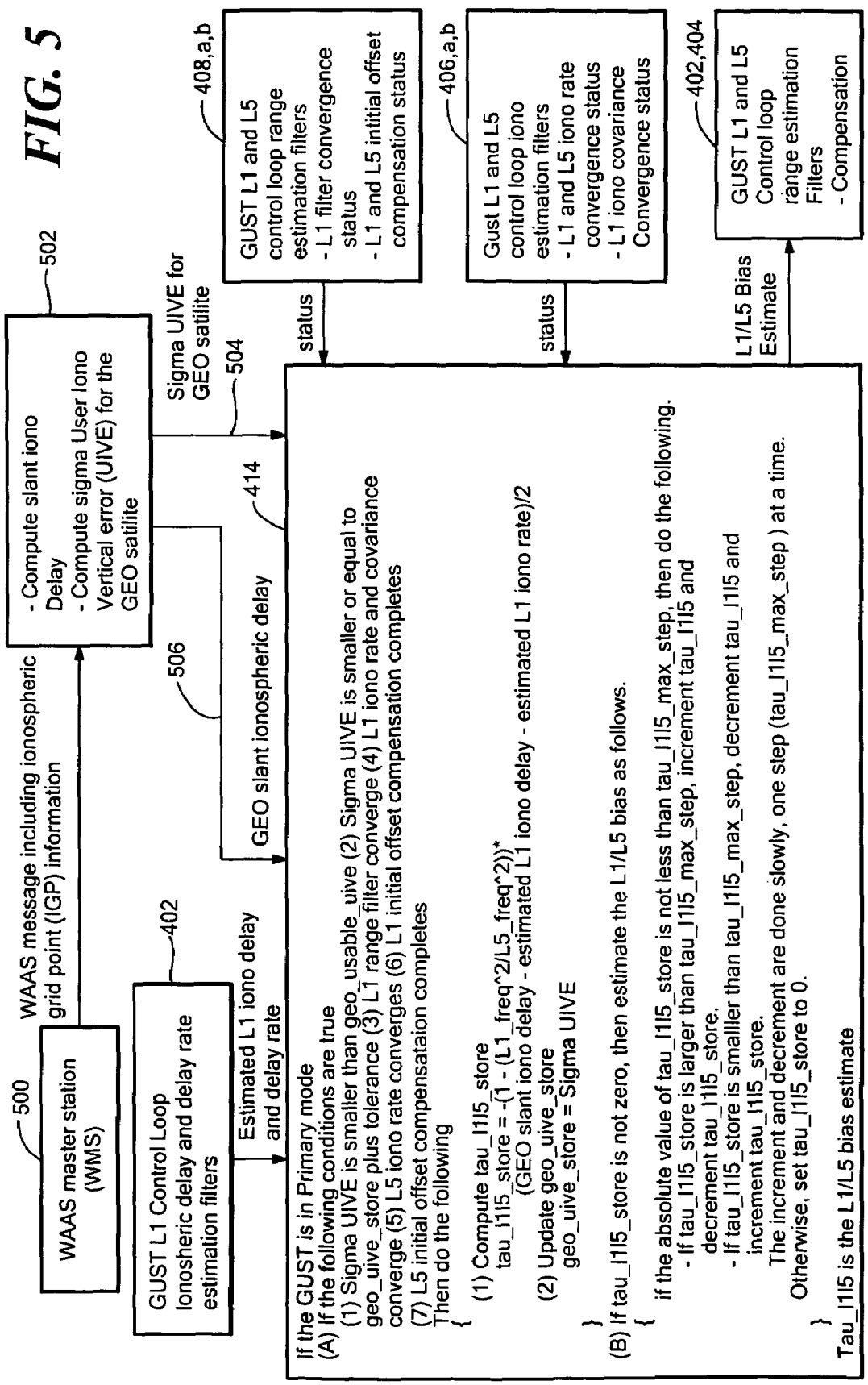

METHOD AND APPARATUS FOR WIDE AREA AUGMENTATION SYSTEM HAVING L1/L5 BIAS ESTIMATION

STATEMENT REGARDING FEDERALLY SPONSORED RESEARCH

The Government may have rights in the invention pursuant to Contract Number DR145940, which is a subcontract FAA contract DTFA01-03-C-00059.

CROSS REFERENCE TO RELATED APPLICATIONS

Not applicable.

BACKGROUND

The Wide Area Augmentation System (WAAS) is a safety critical system that augments the Department of Defense Global Positioning System (GPS) Standard Positioning Service (SPS). The WAAS system is described by the WAAS Minimum Operational Performance Standards (MOPS), identified as document RTCA/DO-229C, Minimum Operational Performance Standards for Global Positioning System/ Wide Area Augmentation System Airborne Equipment, 28 Nov. 2001, which is incorporated herein by reference and well known by one of ordinary skill in the art.

The WAAS provides a means for air navigation in the National Airspace System (NAS) from departure through en route and approach. The WAAS augments GPS with the following: a ranging function, which improves availability and reliability; differential GPS corrections, which improve accuracy; and integrity monitoring, which improves safety. The system provides a Signal-in-Space (SIS) to WAAS-certified aircraft avionics for any FAA approved phase of flight. The SIS provides various services including WAAS message broadcast, and ranging capability.

WAAS is divided into three types of sites; the Wide Area Reference Station (WRS), the Wide Area Master Station (WMS) and the GEO Uplink Subsystem (GUS). GUS refers to the GEO Uplink Subsystem implemented in the WAAS program and GUST refers to the GEO uplink Subsystem implemented in the Geostationary Communication and Control Segment (GCCS) program. Wide-Area Reference Stations (WRSs) are distributed throughout the U.S. National Airspace System. These reference stations collect GPS and GEO measurements and send them to the WMSs. The WMSs process the data to provide correctional and integrity information for each GEO and GPS satellite. The correction information includes as separate components the satellite ephemeris errors, clock bias, and ionosphere estimation data. The corrections from the WMS are sent to the GUST for uplink to the GEO.

The Geostationary Communication and Control Segment (GCCS) comprises two GUST subsystems and a GEO satellite. The two GUST subsystems are operationally independent of each other and geographically separated in order to mitigate simultaneous loss due to natural disasters, for example. One GUST subsystem operates as the primary uplink to the satellite while the other GUST subsystem operates as a backup, radiating into a dummy load. Each GUST subsystem includes two subsystems, the Signal Generator Subsystem (SGS) and the Radio Frequency Uplink (RFU) Subsystem. The SGS receives WAAS messages from the WMS and combines the WAAS message with the correct GPS L1 and L5 modulations and Pseudorandom Noise (PRN) Gold Codes to create the WAAS L1 and L5 uplink signals. The RFU receives these IF PRN coded L1 and L5 uplink signals from the SGS, converts them to the RF uplink frequencies, amplifies, and transmits the signals to the GEO Satellite.

The RFU receives the downlink L1 and L5 WAAS signals from the GEO Satellite, amplifies the signals and provides the resulting L1 and L5 signals to the SGS. The SGS extracts the GEO measurements and uses them as inputs to a control loop that adjusts the uplink signal to compensate for the uplink iono delay and Doppler effects such that the code and carrier phase of the downlink L1 and L5 signals are coherent. The GUST subsystem also contains a Cesium frequency standard used as the frequency reference for the signal generator and the receiver.

BRIEF DESCRIPTION OF THE DRAWINGS

The exemplary embodiments contained herein will be more fully understood from the following detailed description taken in conjunction with the accompanying drawings, in which:

FIG. 5 is a block diagram of a system having L1/L5 bias estimation in accordance with the present invention.

DETAILED DESCRIPTION

Figure 1:
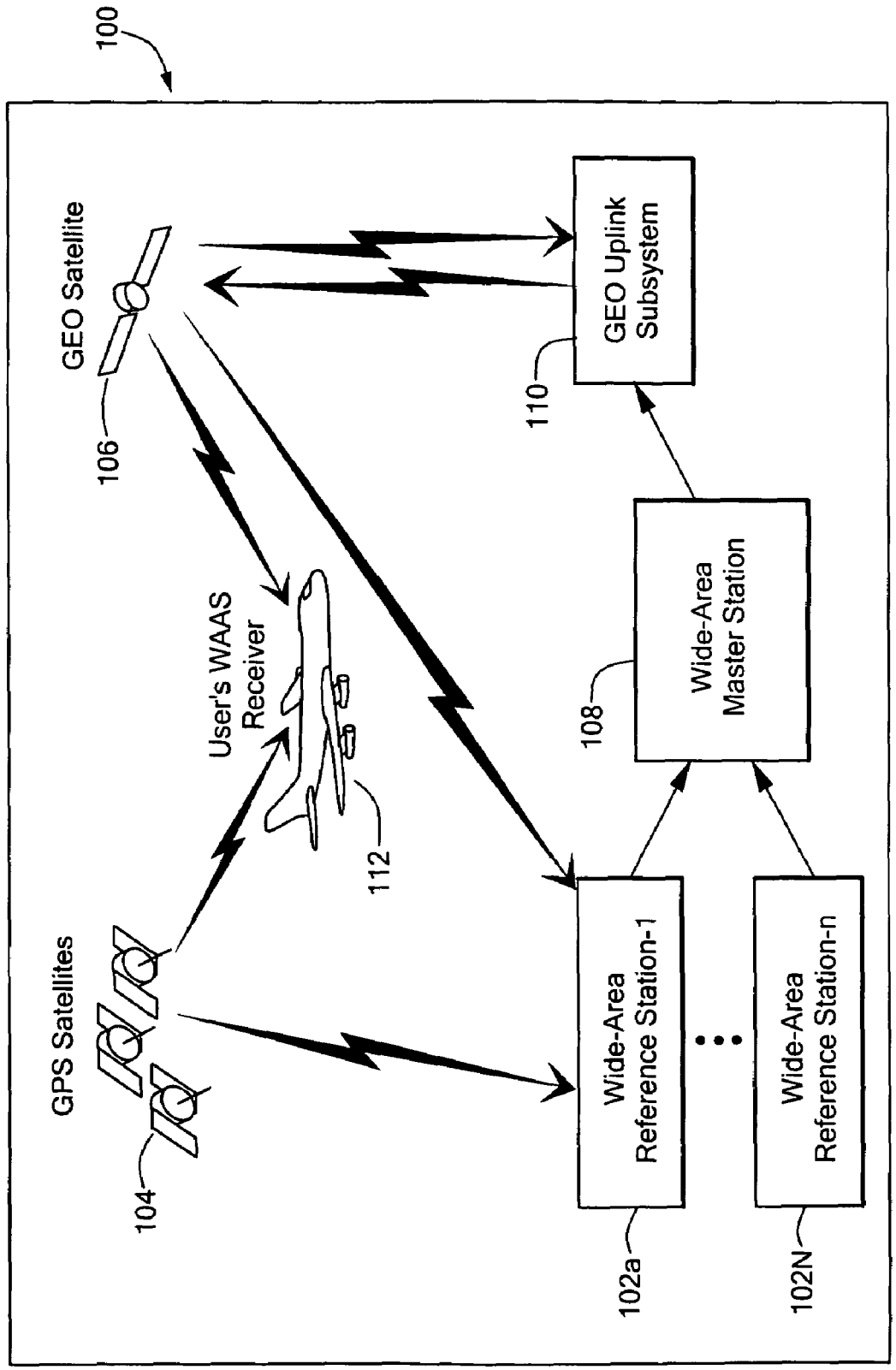
FIG. 1 is a pictorial representation of a WAAS system having a GEO Uplink Subsystem (GUS) in accordance with the present invention.

FIG. 1 shows a WAAS system 100 having signal code carrier coherency in accordance with the present invention in which wide-area reference stations (WRSs) 102a-N receive signals from GPS satellites 104 and a GEO satellite 106. A wide-area master station (WMS) 108 communicates with the wide-area reference stations 102 and provides information to a GEO uplink subsystem (GUS) 110, which receives signals including L1 and L5 signals from the GEO satellite 106 and provide correction information to the GEO satellite 106. A space vehicle (SV) 112, such as an aircraft, uses information from the GPS satellites 104 and the GEO satellite 106 to navigate in space In conventional WAAS systems, the WAAS Wide Area Master Station (WMS) calculates WAAS Network Time (WNT) and estimates clock parameters (offset and drift) for each satellite. The GEO Uplink System (GUS) clock has an independent free running clock. However, the GUS clock must track WNT (GPS time) to enable accurate ranging from the GEO satellite signal-in-space (SIS) so that a clock steering algorithm is necessary. The GUS clock steering algorithms reside in a WAAS Message Processor (WMP). WAAS Type 9 messages (GEO navigation messages) are inputs to the GUS WMP, provided by the WMS.

The GUST clock is steered to the GPS time epoch and WAAS Network Time (WNT). The GUST receiver clock error is the deviation of its 1 PPS (pulse per second) from the GPS epoch. The clock error is computed in a GUS processor by calculating the user position error by combining (in the least square sense, weighted with expected error statistics) multiple satellite data (pseudorange residuals called MOPS residuals) into a position error estimate with respect to surveyed GUS position. The clock error computed this way is relative to WAAS Network Time. The clock steering algorithm is initialized with the WAAS Type 9 message (GEO navigation message). With this arrangement, the GUST receiver clock is kept 1 PPS synchronized with the GPS time epoch. Since a 10 MHz frequency standard is the frequency reference for the receiver, its frequency output needs to be controlled so that the 1 PPS is adjusted. A proportional, integral and differential (PID) controller synchronizes to the GPS time at GUST locations.

The clock steering mechanism also decouples the GUST clock from orbit errors and increases the observability of orbit errors in the orbit determination filter in the correction processor of the WMS. It also synchronizes GUST clocks at GUST locations to GPS time.

Referring again to FIG. 1, the reference stations 102 collect GPS and GEO measurements and send the collected information to the WAAS wide-area master stations (WMSs) 108. The WMSs 108 process the data to provide correctional and integrity information for each GEO and GPS satellite 104, 106. The correction information includes as separate components satellite ephemeris errors, clock bias and ionospheric estimation data. The corrections from the WMS 108 are sent to the GUS 110 for uplink to the GEO satellite 106.

The broadband SIS carriers include L1 and L5 signals for which code-carrier frequency coherence is maintained. The GEO 106 broadcasts the L1 signal at 1575.42 MHz and the L5 signal at 1176.45 MHz. In the L1 path, the GUST 110 receives integrity and correction data and WAAS specific messages from the WMS 108, adds forward error correction (FEC) encoding, and transmits the messages via a C-Band uplink to the GEO satellite 106 for broadcast to the WAAS user, e.g., aircraft 112. The GUST uplink signal uses the GPS standard positioning service waveform (C/A code, BPSK modulation); however, the data rate is higher (250 bits per second). The 250 bits of data are encoded with a one-half rate convolutional code, resulting in a 500-symbols-per-second transmission rate. Each symbol is modulated by the C/A code, a $1.023 \times 10^6$ chips/sec pseudo random sequence, to provide a spread spectrum signal. This signal is then binary phase-shift keying (BPSK) modulated by the GUS 110 onto an intermediate frequency (IF) carrier, upconverted to a C-Band frequency, and uplinked to the GEO 106.

In the conventional WAAS system, a GUS contains a clock steering algorithm that uses WAAS Type 9 messages (GEO navigation) from the WMS to align the GEO's epoch with the GPS epoch. The WAAS Type 9 message contains a term referred to as $a_{Gf0}$ or clock offset. This offset represents a correction, or time difference, between the GEO's epoch and WAAS Network Time (WNT). WNT is the internal time reference scale of WAAS and is required to track the GPS time scale, while at the same time providing users with the translation to Universal Time Coordinated (UTC). Since GPS master time is not directly obtainable, the WAAS architecture requires that WNT be computed at multiple WMSs using potentially differing sets of measurements from potentially differing sets of receivers and clocks (WAAS Reference Stations). WNT is required to agree with GPS time to within 50 nanoseconds. At the same time, the WNT to UTC offset must be provided to the user, with the offset being accurate to 20 nanoseconds. The conventional GUS calculates local clock adjustments. Based upon these clock adjustments, the frequency standard can be made to speed up, or slow the GUS clock. This will keep the total GEO clock offset within the range allowed by the WAAS Type 9 message so that users can make the proper clock corrections in their algorithms.

In another clock steering mechanism the GUST 110 uses the above clock steering method during the initial 24 hours, for example, after it becomes primary. Once the GUST clock is synchronized with WNT, a second inventive method of clock steering uses a composite of the MOPS solution for the receiver clock error, the average of the $a_{Gf0}$, and the average of the MOPS solution as the input to a clock steering controller, as described more fully below.

Figure 2:
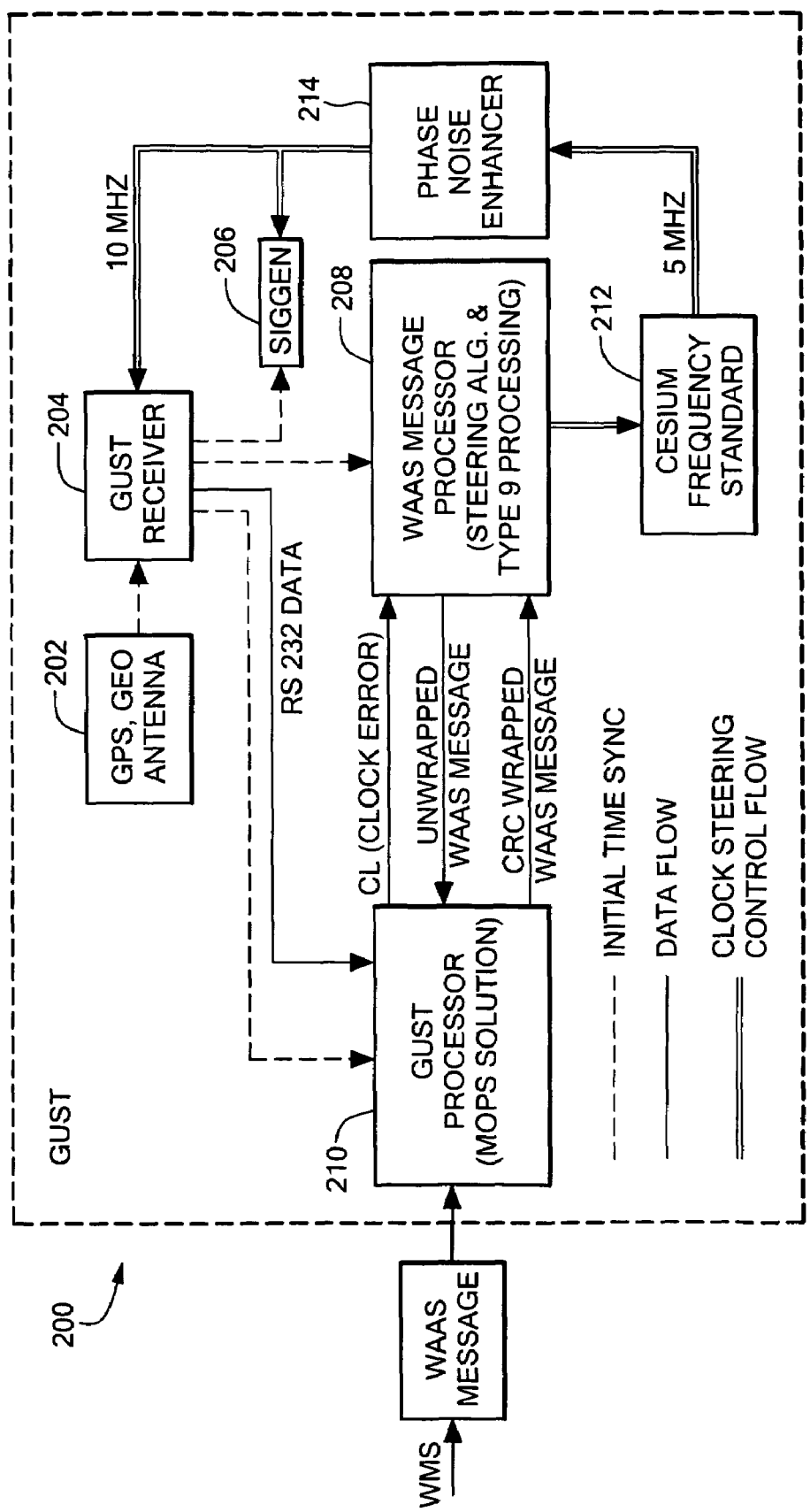
FIG. 2 is a GUST having clock steering in accordance with the present invention.

FIG. 2 shows an exemplary primary GUST system 200 having clock steering. The GUST system 200 includes a Global Positioning System (GPS) and Geosynchronous Satellite antenna 202 coupled to a receiver 204. The receiver 204 provides initial time sync information to a signal generator 206, a WAAS message processor 208 and a GUST processor 210. The GUST receiver 204 also provides data to the GUST processor 210. The WAAS message processor (WMP) 208 provides inventive clock steering control information to the frequency standard system 212, which provides clock steering information to a phase noise enhancer 214, which passes on clock steering information to the receiver 204 and signal generator 206.

In addition, the GUST processor 210 passes on clock error information and sends wrapped WAAS messages to the WAAS message processor 208. The WAAS processor 208 sends unwrapped WAAS messages to the GUST processor 210. The WAAS message processor 208 unwraps the wrapped WAAS message to remove the CRC (Cyclic Redundancy Checking) data and send this unwrapped message (without CRC) to GUST processor 210.

The timing or code phase of the L1 and L5 signal-in-space (SIS) is set by the GUST receiver 204 and the signal generator 206. The GUST receiver 204 is issued based on the input reference frequency from the Cesium frequency standard 212. Without clock adjustment (steering), the Cesium frequency standard 212 output frequency changes over time. This results in the receiver 204 and the signal generator 206 deviating over time from the GPS epoch. Without correction, the deviation eventually becomes so large that the L1 and L5 code phase deviation exceeds the required limit.

By adjusting the Cesium frequency standard 212 with a frequency control command, the receiver 204 and the signal generator 206 can remain synchronized with the GPS epoch and WAAS Network Time (WNT).

For the primary GUST subsystem 200, the code phase deviation of the SIS is also affected by the uplink delay estimation error, and the differential bias between the L1 and L5 signals that has not been compensated for by the control loop. A Type 9 Message Clock Offset aGf0 will be used in the initial clock steering to drive the initial code phase deviation to zero. Any code phase deviation due to the L1/L5 bias that occurs later will be corrected by using a long-term average of the aGf0 and used as input to the clock steering control laws.

For the backup GUST subsystem, the intent of the clock steering is to keep the receiver and signal generator synchronized with the WAAS Network Time (or GPS time). By achieving this synchronization, the clock error difference between primary and backup GUST is minimized.

Figure 3:
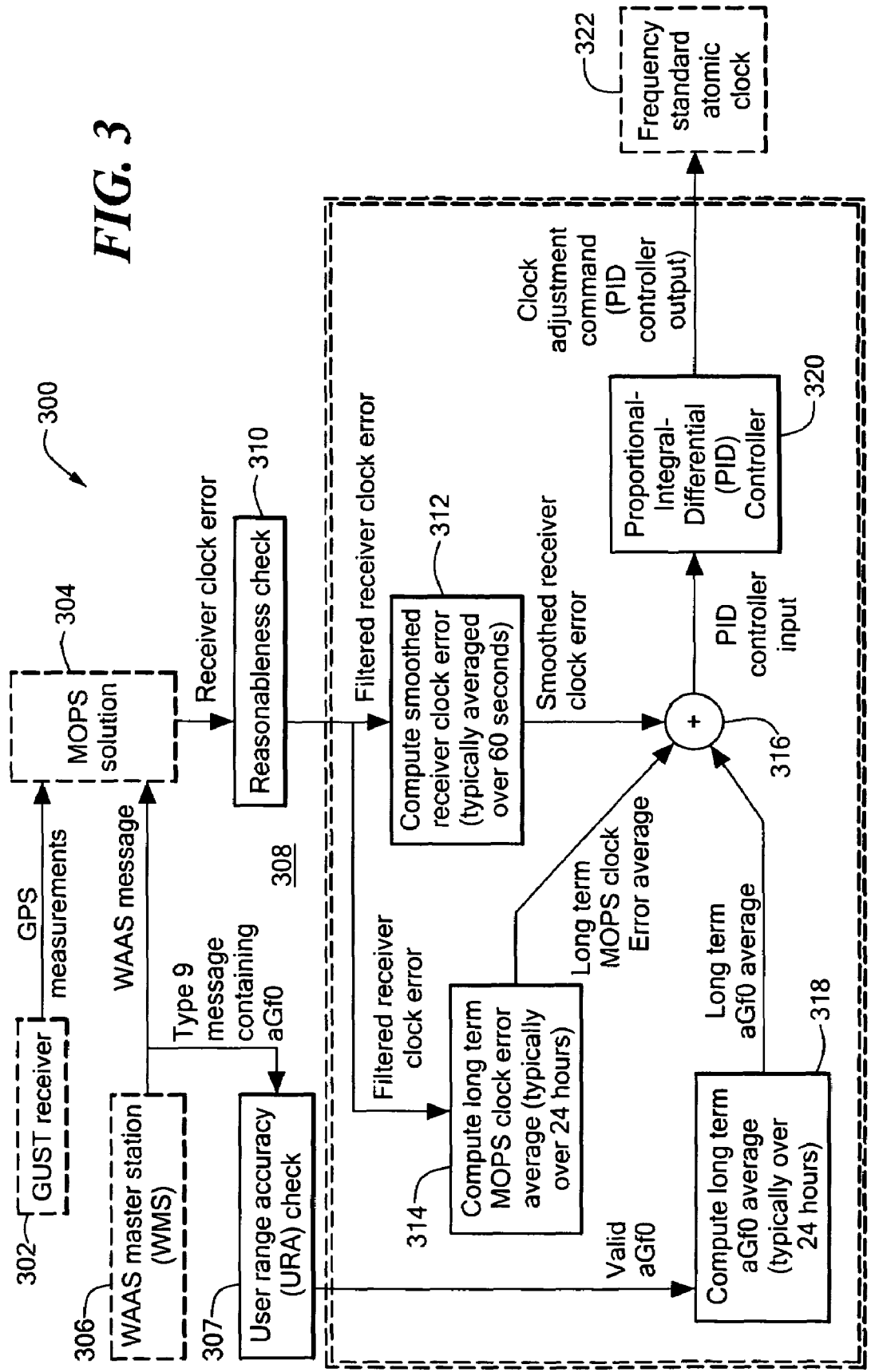
FIG. 3 is a schematic depiction of an exemplary clock steering mechanism in accordance with the present invention.

FIG. 3 shows a primary GEO uplink subsystem type-1 (GUST) 300 with clock steering in accordance with the present invention. A GUST receiver 302 sends GPS measurements to a GUST processor 304, which can be substantially similar to the GUST processor 110 of FIG. 1. A WAAS master station (WMS) 306 provides WAAS messages to the GUST processor 304 and a Type 9 message containing aGf0 information to a user rage accuracy (URA) check module 307. In an exemplary embodiment, the processing associated with blocks 307, 310, 312, 314, 316, 318, and 320 in can be performed in the WAAS message processor 208 of FIG. 2. The processing for block 304 can be performed in the GUST processor 210.

The GUST processor 304 sends receiver clock error information to a WAAS message processor 308 which performs a conventional reasonableness check 310 process. The reasonableness check process 310 outputs a filtered receiver clock error to smoothing module 312 and a long-term MOPS clock error module 314. The smoothing module 312 computes a smoothed receiver clock error, which can be averaged over sixty seconds, for example. The smoothing module provides a smoothed receiver cock error output to a summing module 316. More particularly, the smoothing module 312 takes the sum of the current receiver clock error and all the valid receiver clock errors that pass the reasonableness check (module 310) in the last X seconds. It then divides that sum by the total number of valid receiver clock error to obtain the smoothed receiver clock error. In one embodiment, X=59 seconds so that the average is computed over a 60-second period. In general, X should be no more than 3600 (1 hour).

The long term MOPS clock error module 314, which receives the filtered receiver clock error from the reasonableness check module 310, computes the long term MOPS clock error average, such as over a twenty-four hour period. The long term MOPS clock error average is provided to the summing module 316. First, the sum of all valid receiver clock errors that pass the reasonableness check (module 310) over the past Y hours is computed. The sum is then divided by the number of valid receiver clock errors to obtain the long term MOPS clock error average. The value for Y is typically 24 hours.

A long-term aGf0 module 318, which receives a valid aGf0 signal from the URA check module 307, computes a long term aGf0 average, such as over twenty four hours. The aGf0 module 318 provides a long-term aGf0 signal to the summing module 316. First, the sum of all valid aGf0 messages that pass the User Range Accuracy (URA) check (module 307) over the past Z hours is computed. The sum is then divided by the number of valid aGf0's to obtain the long term aGf0 average. The value for Z is typically 24 hours.

The summing module 316 provides an input to a proportional-integral-differential (PID) controller 320, which is described more fully below. The PHD controller 320 then provides clock adjustment command information to the frequency standard atomic clock 322.

Clock steering in the Primary GUST is now described in further detail. Determination of receiver clock error is based on the user position solution algorithm described in the WAAS MOPS. Components of the MOPS weighted least squares solution are the observation matrix (G), the measurement weighting matrix (W) and the MOPS residual column vector ($\Delta\rho$). The weighted gain matrix (K) is calculated using G and W as set forth in Equation (1) below:

$$K = (G^T W G)^{-1} G^T W \qquad \text{Eq. 1}$$

The column vector then for the user position error and the clock bias solution is described in Equations (2a, 2b, 2c) below:

$$\Delta X = K \Delta \rho \qquad \text{Eq. 2a}$$

$$\Delta X = (G^T W G)^{-1} G^T W \Delta \rho \qquad \text{Eq. 2b}$$

where:

$$\Delta X = \begin{bmatrix} (N) \\ (E) \\ (U) \\ C_b \end{bmatrix} \qquad \text{Eq. 2c}$$

and $\Delta X(U)$ is the Up error, $\Delta X(E)$ is the East error, $\Delta X(N)$ is the North error and $C_b$ is the clock bias or receiver clock error as a resultant of the MOPS weighted least squares solution.

The observation matrix (G), n×4, is computed in Up-East-North (UEN) reference using the line of sight (LOS) azimuth ($Az_i$) and LOS elevation ($El_i$) from the GUST omni antenna to the space vehicle (SV). The value n is the number of satellites in view. The formula for calculating the observation matrix is set forth in Equation (3):

$$G = \begin{bmatrix} \cos(El_1)\cos(Az_1) & \cos(El_1)\sin(Az_1) & \sin(El_1) & 1 \\ \cos(El_2)\cos(Az_2) & \cos(El_2)\sin(Az_2) & \sin(El_2) & 1 \\ \vdots & \vdots & \vdots & \vdots \\ \cos(El_n)\cos(Az_n) & \cos(El_n)\sin(Az_n) & \sin(El_n) & 1 \end{bmatrix} \qquad \text{Eq. 3}$$

The n×n weighting matrix (W) is a function of the total variance ($\sigma_i^2$) of the individual satellites in view. The inverse of the weighting matrix is show below in Equation (4):

$$W^{-1} = \begin{bmatrix} \sigma_1^2 & 0 & 0 & \vdots & 0 \\ 0 & \sigma_2^2 & 0 & \vdots & 0 \\ 0 & 0 & \sigma_3^2 & \vdots & 0 \\ \vdots & \vdots & \vdots & \ddots & \vdots \\ 0 & 0 & 0 & 0 & \sigma_n^2 \end{bmatrix} \qquad \text{Eq. 4}$$

Equation (5) to calculate the total variance ($\sigma_i^2$) is:

$$\sigma_i^2 = \left(\frac{UDRE_i}{3.29}\right)^2 + \left(\frac{F_{ppi}^2 \times \sigma_{UIVE_i}^2}{3.29^2}\right) + \frac{\sigma_{tropo,i}^2}{\sin^2(El_i)} \qquad \text{Eq. 5}$$

The algorithms for calculating user differential range error (UDREi), user ionospheric vertical error variance $\sigma_{UIVE_i}^2$, LOS obliquity factor ($F_{ppi}$), and the standard deviation of uncertainty for the vertical troposphere delay model ($\sigma_{tropo,i}$) are found in the WAAS MOPS and well known to one of ordinary skill in the art.

The MOPS residuals ($\Delta\rho$), as described below in Equation (6) are the difference between the smoothed MOPS measured pseudorange ($PR_{M,i}$) and the expected pseudorange ($PR_{corr,i}$):

$$\Delta\rho = PR_{M,i} - PR_{corr,i} \qquad \text{Eq. 6}$$

The MOPS measured pseudorange ($PR_{M,i}$) in earth centered earth fixed (ECEF) reference is corrected for earth rotation, for WAAS clock corrections, for ionospheric effects and for tropospheric effects. Equation (7) to calculate $PR_{M,i}$ is:

$$PR_{M,i} = PR_{L,i} + \Delta PR_{CC,i} + \Delta PR_{FC,i} + \Delta PR_{ER,i} - \Delta PR_{T,i} - \Delta PR_{I,i} - \Delta PR_{mp} \qquad \text{Eq. 7}$$

The algorithms to calculate smoothed L1 pseudorange ($PR_{L,i}$), pseudorange clock correction ($\Delta PR_{CC,i}$), pseudorange fast correction ($\Delta PR_{FC,i}$), pseudorange earth rotation correction ($\Delta PR_{ER,i}$), pseudorange troposphere correction ($\Delta PR_{T,i}$) and pseudorange ionosphere correction ($\Delta PR_{I,i}$) are found in the WAAS MOPS. The computation of pseudorange multipath correction ($\Delta PR_{mp}$) is well known to one of ordinary skill in the art.

Expected pseudorange ($PR_{corr,i}$), ECEF, at the time of GPS transmission is computed from broadcast ephemeris corrected for fast and long term corrections. The calculation is defined in Equation (8) below:

$$PR_{corr,i} = \sqrt{(X_{corr,i}-X_{GUS})^2+(Y_{corr,i}-Y_{GUS})^2+(Z_{corr,i}-Z_{GUS})^2} \quad \text{Eq. 8}$$

The algorithm to calculate SV position corrections ($X_{corr,i}$, $Y_{corr,i}$, $Z_{corr,i}$) is found in the WAAS MOPS. The fixed position parameters of the GUST ($X_{GUST}$, $Y_{GUST}$, $Z_{GUST}$) are site specific.

Conventional dual frequency carrier leveling techniques can be used to reduce the multipath noise. Carrier cycle slip monitors are provided to protect the carrier level algorithms.

The measurement multipath noise is then estimated as a function of continuous carrier leveling time using a deterministic algorithm that is based on the maximum initial multipath for the GUST receiver correlator spacings and the time since the last cycle slip.

Each of the GUST receivers generates pseudorange and carrier phase measurements for those satellites in view. If the satellite's pseudorange signals are reflected and delayed (relative to the direct signal) in arriving at the GUST receiver, then the measurement data may be in error for those satellites. The amount of the error is dependent on the delay time and the receiver correlator type. The system corrects for multipath errors utilizing the pseudorange and the carrier phase measurement (which is not subject to significant multipath errors) received.

For both the primary and backup GUST clock steering algorithm, in an exemplary embodiment, the control law is implemented using a PID (proportional plus integral plus differential) controller and it has the following formulation. The PID controller in s domain is formulated as follows in Equation (9).

$$u(s)=k^*e(s)+(k/T_I)^*(1/s)e(s)+k^*T_D^*e(s)^*s$$

where k is the proportional gain, $T_I$ is the integral time, $T_D$ is the differential time, e(s) is the input to the controller, and u(s) is the output of the controller. When the above equation is transformed into discrete time domain, Equation (10) below results:

$$u(n)=u(n-1)+(k+kT/T_I+kT_D/T)e(n)-(k+2^*kT_D/T)e(n-1)+kT_D/Te(n-2) \quad \text{Eq. 10}$$

where T is the sampling time.

Let k_alpha=(k+kT/$T_I$+k$T_D$/T), k_beta=−(k+2*k$T_D$/T), and k_gamma=k$T_D$/T and let x(t) be the clock error. Since the control system compensates for the frequency drift, the input x(t) has to be negated so that x(t) equals to −e(t) and equation (11) below is obtained.

$$u(n)=-k\_alpha^*x(n)+k\_beta^*x(n-1)+k\_gamma^*x(n-2)) \quad \text{Eq. 11}$$

The output of the control law is the frequency adjustment command that will be sent to the frequency standard 322 to adjust the atomic clock frequency. The adjusted atomic clock frequency will keep the receiver 302 and the signal generator 206 (FIG. 2) synchronizing with the GPS epoch and WAAS Network Time. Thus, closed loop control of the frequency standard 322 is established.

Twenty-four hours, for example, after the GUST becomes Primary, the input to the PID controller is the combination of different errors as follows in Equation (12):

PID input = smoothed receiver clock error − $\quad$ Eq. 12 long term MOPS clock error average + long term Type 9 aGf0 average

The PID input described in Equation (12) is the counterpart of x(n) in Equation (11). The PID inputs in Equation (12) that are computed in the previous time stamps n−1 and n−2 are the counterparts of x(n−1) and x(n−2) in Equation (11) respectively.

As described above, smoothed receiver clock error 312 is the average of the filtered receiver clock error over a short period of time that is typically no more than 1 hour, and it is calculated continuously. Long term MOPS clock error 314 is the average of the filtered receiver clock error over a long period of time that is typically twenty-four hours, and it is calculated typically once every twenty-four hours. Long term Type 9 aGf0 average 318 is the average of the Type 9 message clock offset aGf0 over a period of time that is typically twenty-four hours, and it is calculated typically once every twenty-four hours.

For the backup GUST subsystem, only the smoothed receiver clock error described above is used as the input to the PID controller.

In another aspect of the invention, the L5 signal code carrier coherency is maintained during GUST initialization and after switchover. When the Primary GUST is faulted, the Backup GUST will become the new Primary, and the faulted Primary GUST will go into Backup mode. This is called a GUST switchover. A GUST switchover can also be initiated manually by an operator of the system.

A GUST processing (GPT) software resides in multiple processors and receives WAAS messages from the WMS and combines the WAAS message with the correct GPS L1 and L5 modulations and Pseudorandom Noise (PRN) Gold Codes to create the WAAS L1 and L5 uplink signals. The RFU receives these IF PRN coded L1 and L5 uplink signals from the SGS, converts them to the C-band RF uplink frequencies, amplifies, and transmits the signals to the GEO Satellite.

Figure 4:
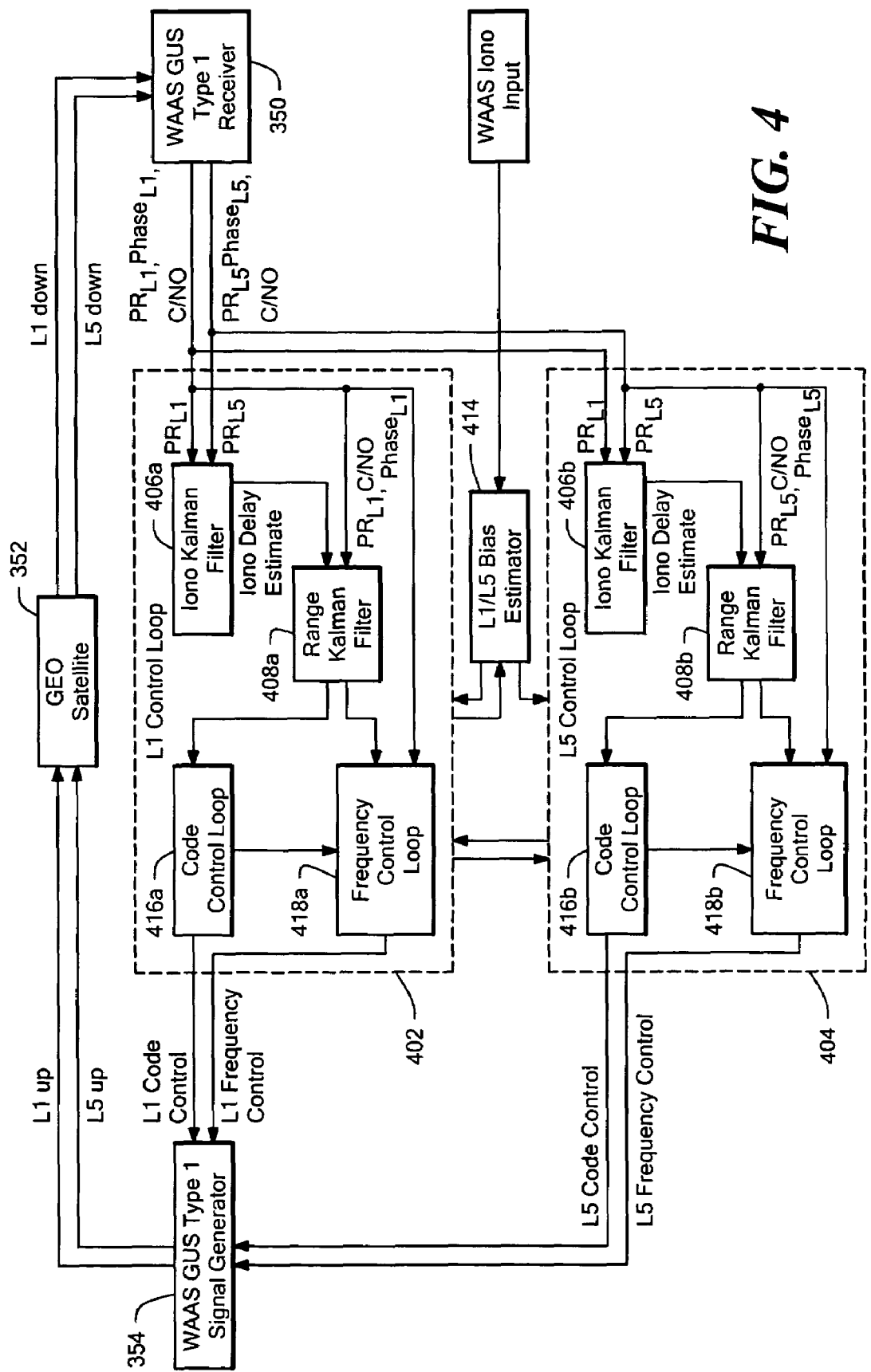
FIG. 4 is a block diagram of a GEO Uplink Subsystem Type 1 (GUST)

As shown in FIG. 4, a receiver 350 receives the downlink L1 and L5 WAAS signals from the GEO Satellite 352 and provides the resulting L1 and L5 GEO measurements. These measurements are used as inputs to control loops 402 and 404, as discussed below.

L1 and L5 control loops 402, 404 each include four functions: iono Kalman filter 406a, 406b, range Kalman filter 408a, 408b, code control 410a, 410b, and frequency control 412a, 412b. In addition, both the L1 and L5 control loops 402, 404 receive input from a L1/L5 bias estimation module 414. Each control loop 402, 404 further includes a code control loop 416a,b and a frequency control loop 418a,b.

The L1 and L5 iono Kalman filters 406a, b estimate the slant iono delay (the delay of the GEO signal caused by the ionosphere), and the rate of change of the iono delay. The range Kalman filters 408a,b estimate the range between the GEO satellite 352 and the GUST, the range rate (rate of change of the range), the range acceleration, and the acceleration rate.

At cold start, the signal generator 354 is initialized with a code chip advance and a code chip rate such that the pre-determined uplink range between the GEO satellite, the uplink path hardware delay, the GEO satellite transponder delay, and the Doppler effect on the uplink code are compensated for. During initialization after cold start to Primary mode, the code control loop 406 computes the compensation value for the Doppler's effects on the code chip rate, and the GEO range offset. GEO range offset is the discrepancy between the pre-determined values for the parameters mentioned above and the sum of the actual GEO range and other hardware delays.

After GUST switchover to Primary mode, the code control loop 416 computes the compensation for the pre-determined uplink range between the GEO satellite, the uplink path hardware delay, the GEO satellite transponder delay, and the Doppler effect on the uplink code, and the pseudorange jump (described below).

The computation includes command_chip_rate, and output_chip_rate.

$L1$ output chip rate=$L1$_command_chip_rate+$1.023 \times 10^6$ chip/second $L5$ output chip rate=$L5$_command_chip_rate+$10.23 \times 10^6$ chip/second The frequency control loop 418 computes the compensation value for the Doppler's effects on the uplink signal, and the GEO satellite transponder frequency offset. The computation includes command_frequency and output_frequency.

$L1$ output frequency=$L1$_command_frequency+$10^7$ Hz $L5$ output frequency=$L5$_command_frequency+$10^7$ Hz The GPT sends the L1 output chip rate, the L1 output frequency, the L5 output chip rate, and the L5 output frequency to the signal generator 354. The signal generator 354 in turns adjusts its output signal based on these inputs.

The nominal GEO L5 code chip rate is $10.23 \times 10^6$ chips per second, which is 10 times the nominal chip rate for L1 C/A code. Because of this higher code chip rate, the GUST receiver is more sensitive (has a tighter tolerance) on L5 code carrier divergence than L1.

One way to characterize the code carrier divergence between the downlink L5 code and carrier is the ratio between the carrier frequency and the code chip rate. The nominal frequency of the L5 carrier is $1176.45 \times 10^6$ Hz, and the nominal chip rate of the L5 code is $10.23 \times 10^6$ chips per second. The ratio (nominal frequency+downlink Doppler for L5 carrier)/(nominal chip rate+downlink Doppler for L5 code) is 115.

The GUST receiver 350 can tolerate a certain frequency offset in the carrier without losing lock of the GEO signal. In other words, given the two conditions below, the frequency offset can not exceed a certain limit, e.g., +/−95 Hz.

$L5$ carrier frequency=$1176.45 \times 10^6$ Hz−GEO range rate/$L5$ wavelength+frequency offset,     Condition (1)

$L5$ code chip rate=$10.23 \times 10^6$ chips per second−GEO range rate/$L5$ chip width,     Condition (2)

where

L5 wavelength=speed of light/L5 carrier nominal frequency=$299792458/(1176.45 \times 10^6)$ m, L5 chip width=speed of light/L5 code nominal chip rate=$299792458/(10.23 \times \times 10^6)$ m, GEO range rate is the true rate of change of the range between the GEO satellite and the GUST site, GEO range rate/L5_wavelength is the Doppler for the carrier, and GEO range rate/L5 chip width is the Doppler for the code.

The GUST receiver will lose lock of the L5 signal when the frequency offset (in Hz) mentioned above exceeds a certain limit.

Another situation is when the frequency offset above is zero and there is an L5 code offset. The code offset will have a limit that is equivalent to the limit in the frequency offset and it is calculated as follows: L5 chip_rate_offset_limit=−frequency offset limit Hz*L5 wavelength/L5 chip width in chips per second In other words, given the two conditions below, the L5 code offset cannot exceed +/−chip_rate_offset_limit in chips per second.

$L5$ carrier frequency=$1176.45 \times 10^6$ Hz−GEO range rate/$L5$ wavelength     Condition (1)

$L5$ code chip rate=$10.23 \times 10^6$ chips per second−GEO range rate/$L5$ chip width+$L5$ code offset     Condition (2)

When the L5 code offset mentioned above exceeds +/−chip_rate_offset_limit (in chips per second), the GUST receiver 350 will lose lock of the L5 signal.

Once the L5 signal loses lock during GUST initialization or switchover, both the L1 and the L5 control loops 402, 404 cannot transition into steady state control mode. There is a separate algorithm in the steady state control that keeps the L1 and L5 code and carrier coherent within the required limits defined in the GCCS specification. Without the steady state control, the code carrier coherence required by the specification is no longer achievable. As is known in the art, the variables that represent steady state control mode for L1 and L5 control loops are L1_dynamic_frequency_control and L5_dynamic_frequency_control respectively.

The command frequency is initialized by a control algorithm with a value that compensates for the Doppler's effect on the signal in the uplink path, and the GEO transponder frequency offset. The uplink Doppler is estimated based on the initial estimated GEO range rate (rate of the change of the GEO range). The initial estimated GEO range rate is computed based on the velocity in ECEF (earth-centered earth-fixed) coordinated frame contained in the WAAS Type 9 message. The control algorithm also initializes the command chip rate to compensate for the Doppler effects on the code. The Doppler effects on the code is estimated based on the initial GEO range rate as mentioned above. The transponder offset is predetermined and defined as a site-specific parameter during field integration.

After the GUST switchover, the new Primary GUST uplinks the two C-band signals to the GEO satellite. The GEO satellite transponders in turn convert them into L1 and L5 signals. As noted above, the signal code advance is set based on predetermined values when the GUST is cold start into backup mode. The uplink signal code chip rate is set when the GUST is still in Backup mode prior to the switchover. The uplink signal code chip advance and chip rate may cause the actual L5 pseudorange to be longer or shorter than the projected L5 pseudorange. The discrepancy between the two GUST clocks also contributes to the discrepancy between the actual L5 pseudorange and the projected L5 pseudorange. The L5 projected pseudorange is one that is projected based on the L5 estimated range and range rate prior to the GUST switchover. This discrepancy is called pseudorange jump. The L5 code control loop 416 in the new Primary GUST will adjust the L5 code chip rate such that the L5 pseudorange will eventually equal the projected L5 pseudorange. In other words, the L5 pseudorange jump is compensated.

The inventive technique for maintaining L5 code carrier coherence during initialization of the GUST control loop may be contained in several different functional modules.

L5 Code Control

During the initialization of the control loop following a cold start to Primary mode, the L1 control loop 402 adjusts the code chip rate to compensate for the initial GEO range offset in addition to the Doppler's effect on the code chip rate. The initial GEO L1 range offset is the discrepancy between the L1 pseudorange with estimated iono delay excluded, and the predetermined GEO range that the signal generator is initialized with. The initial GEO range offset for the L1 control loop 402 is close to the offset for the L5 control loop 404. The L5 code control loop 416b compensates for the initial GEO range error for L5 control loop by following the L1 code compensation. Once the initial GEO range offset compensation is completed in the L1 control loop 402, the logical flag L1_init_offset_compensated is set to TRUE. The L5 chip rate command will stop following the L1 chip rate command. The pseudocode for this algorithm is as follows:

```
if (GUST becomes Primary mode from cold start) &
(L1_init_offset_compensated is FALSE)
   L5_command_chip_rate (t) = L1_command_chip_rate (t)
                        *L1_chip_width/L5_chip_width;
   where the L1_init_offset_compensated variable is a logical flag
   signifies the completion of the initial GEO L1 range offset
   compensation. It is set to TRUE when the compensation is
   completed, and it is set to FALSE when the compensation has not
   completed.
```

When the initial L1 GEO range offset compensation is completed, the L1 estimated range rate is a relatively accurate estimate of the true range rate. If the GEO satellite L5 transponder offset has been computed, and if L5 range Kalman filter 408b has not converged, use the temporary L5 range rate (L1 estimated range rate) to compute the L5 command chip rate. This will minimize the range rate error and thus the code carrier divergence. The pseudocode for this algorithm is as follows.

```
if ((L5_range_KF_range_covar (t) > L5_range_KF_range_covar_convergence) or
     (L5_range_KF_range_rate_covar (t) >
L5_range_KF_range_rate_covar_convergence) ) &
     (GUST becomes Primary mode from cold start) &
     (time since GUST becomes Primary from cold start <=
primary_mode_init_period) &
     (L5_static_transponder_offset_computed = = 1)
{
   L5_command_chip_rate (t) = L5_temporary_range_rate/L5_chip_width;
   L5_command_chip_accel (t) = 0;
}
   where L5_range_KF_range_covar is the covariance of the L5 range
Kalman filter
         L5_range_KF_range_rate_covar (t) is the range rate covariance of
   the L5 range Kalman filter
         L5_range_KF_range_covar_convergence is a pre-determined
   convergence threshold
         L5_range_KF_range_rate_covar_convergence is a pre-determined
   convergence threshold
         primary_mode_init_period is a pre-determined length of time
         L5_temporary_range_rate is equal to L1 estimated rage rate (as
shown below)
```

L5 Frequency Control

When the initial GEO L1 range offset compensation is completed, the L1 estimated range rate is used as the temporary L5 range rate in the computation of the GEO satellite L5 transponder offset. The error due to the range rate estimate is minimized because of the accuracy of the L1 estimated range rate. The pseudo code for this algorithm is as follows.

```
if (L5_static_transponder_offset_computed is FALSE) &
(L1_init_offset_compensated is TRUE)
{
   L5_temporary_range_rate = L1_range_KF_range_rate;
```

```
L5_temporary_average_doppler =
     (L5_doppler (t) +
     L5_doppler_store (1) +
     L5_doppler_store (2) +
     L5_doppler_store (t) +
     L5_doppler_store (4))/5;
if (|L5_doppler (t) – L5_temporary_average_doppler| <
L5_doppler_outlier_threshold)
     &
     (|L5_doppler_store (1) – L5_temporary_average_doppler| <
L5_doppler_outlier_threshold)
     &
     (|L5_doppler_store (2) – L5_temporary_average_doppler|<
L5_doppler_outlier_threshold)
     &
     (|L5_doppler_store (3) – L5_temporary_average_doppler| <
L5_doppler_outlier_threshold)
     &
     (L5_doppler_store (4) – L5_temporary_average_doppler| <
L5_doppler_outlier_threshold)
     {
        L5_average_doppler = L5_temporary_average_doppler;
        L5_static_transponder_offset = L5_average_doppler
          – L5_initial_target_frequency
          – (–L5_temporary_range_rate/CU_lambda_L5_loop)
          – (–L5_temporary_range_rate/L5_lambda)
        L5_target_freq = – L5_static_transponder_offset
          – (–L5_temporary_range_rate/CU_lambda_L5_loop)
        L5_static_transponder_offset_computed = TRUE;
        L5_initial_frequency_control = TRUE;
     }
}
```

```
   where L5_initial_target_frequency is the same as the initialized
L5 command frequency
     CU_lambda_L5_loop is the wavelength of the C-band uplink
signal in the L5 path
     L5_lambda is the wavelength of the L5 signal
     L5_doppler is the Doppler in Hz measured by the receiver
     L5_doppler_outlier_threshold is a pre-determined threshold
     L5_doppler_store is an array that contains the previous
     L5_doopler values
```

Once the GEO satellite L5 transponder offset is computed, keep the L5 code and carrier coherent in the following way until the steady state control mode is reached.

```
if (L5_initial_frequency_control is TRUE)
{
    Continue updating L5_temporary_range_rate with the estimated L1
    range rate as follows until the L5 range Kalman filter has converged
    (ie, until L5_init_offset_compensated is set to TRUE).
    if (L5_init_offset_compensated is FALSE)
        L5_temporary_range_rate = L1_range_KF_range_rate;
    L5_target_freq (t) = -L5_static_transponder_offset
        + (L5_command_chip_rate (t)
        -L5_temporary_range_rate/
        L5_chip_width)*L5_nominal_CC_ratio
        + L5_temporary_range_rate/CU_lambda_L5_loop;
}
where L5_nominal_CC_ratio is a constant that equals to 115
    L5_command_chip_rate is computed in the L5 Code Control function
L5_target_freq is then rate-limited to become L5_command_frequency.
```

Once the L5 control loop has transitioned into the steady state control mode, the variable L5_initial_frequency_control is reset to FALSE.

Maintaining L5 CODE Carrier Coherence after Gust Switchover

The algorithm for maintaining L5 code carrier coherence right after the GUST switchover is embedded in the L5 frequency control loop 418b.

As mentioned above, L5 pseudorange jump could occur after the GUST switchover. The control loop will immediately compensate for the pseudorang jump. While the code control loop 416b is doing that, the frequency compensation has to be consistent with the code compensation such that the code and carrier divergence is kept from exceeding the limit.

The pseudo code for the algorithm that keeps the code carrier coherent while the pseudorange jump is being compensated is as follows.

```
if (L5_switchover_initial_frequency_control is TRUE)
{
    L5_command_freq = -L5_static_transponder_offset
        + (L5_command_chip_rate -
        saved_L5_range_KF_range_rate/L5_chip_width)
        *L5_nominal_CC_ratio +
        saved_L5_range_KF_range_rate/CU_lambda_L5_loop;
}
    where
    L5_static_transponder_offset is estimated by the old Primary GUST
    before the GUST switchover, and
    saved_L5_range_KF_range_rate is the GEO range rate estimated
    by the L5 range Kalman filter before the GUST switchover occurs.
```

Once the L5 control loop has transitioned into the steady state control mode, the variable L5_switchover_initial_frequency_control is reset to FALSE.

In another aspect of the invention, real time estimation of the differential bias between L1 and L5 signal is provided. Estimates of the ionospheric delay and delay rate for both L1 and L5 signal are used by the GUST control loop. The estimation of the iono delay is performed using L1 and L5 Kalman filters, such as filters 406a,b in FIG. 4. Inputs to the L1, L5 iono filters 406a,b include pre-determined L1 downlink delay, L5 downlink delay, L1 pseudorange, and L5 pseudorange values, for example. The GUST control loop scales the difference of L1 and L5 pseudorange and the predetermined L1 and L5 downlink delay, and uses these results as a Kalman filter measurement. Differential bias between the L1 and L5 signals may result in an inaccurate estimation of the iono delays.

Differential bias between the L1 and L5 signals may exist due to a number of factors such as the use of two independent signal generator channels, two independent satellite transponders, cable delays in the downlink paths, and bias between the L1 channel and the L5 channel in the receiver. These error sources can be categorized as uplink path bias and the downlink path bias. The differential bias will appear to the iono Kalman filter as ionospheric delay. Without compensating for this differential bias, the GUST ionospheric delay estimate may not be accurate. An inaccurate estimation of the iono delay will result in control loop error or GEO signal code phase deviation.

In order for the GUST control loop to do the compensation, this bias should be determined. However, it may not be possible to readily identify the source of the differential bias. In other words, an estimation mechanism may not be able to distinguish how much of the error is from the uplink path and how much is from the downlink path, only an estimate of the size of the composite differential bias.

In accordance with one aspect of the invention, the differential bias tau_1115 can be determined by comparing the estimated L1 iono delay (Kalman filter estimate) to the GEO slant iono delay (variable Wiono). The GEO slant iono delay is calculated from the Ionospheric Grid Point (IGP) information in a WAAS message. The detailed computation of the GEO slant iono delay (Wiono) is known and described in Section A4.4.10 of RTCA/DO229C, Minimum Operational Performance Standards for Global Positioning System/Wide Area Augmentation System Airborne Equipment, 28 Nov. 2001, by RTCA, Inc., which is incorporated herein by reference.

In one embodiment, computation of L1/L5 bias estimation tau_1115 is only performed when the GUST is in primary mode. One of the conditions for the estimation mechanism to use the GEO slant iono delay as the reference is that the square root of $\sigma_{UIVE,GEO}^2$ (called Sigma UIVE below, or geo_uive in the pseudocode) is smaller than or equal to its value at the last update plus a tolerance, where UIVE refers to User Ionospheric Vertical Error and $\sigma_{UIVE,GEO}^2$ reflects the accuracy of the GEO slant iono UIVE, GEO delay. By using the GEO slant iono delay to update the L1/L5 bias estimation when Sigma UIVE is smaller than or equal to the previous value plus a tolerance, the estimation will have the same or better accuracy compared to the previous update.

FIG. 5 shows an exemplary embodiment having L1/L5 bias estimation in accordance with the present invention. Reference is made to certain elements and reference numbers in FIG. 4 where like reference numbers indicate like elements. In general, the L1/L5 bias estimator 414 provides an L1/L5 bias estimate to the L1 and L5 control loops 402, 404.

A WAAS master station 500 provides WAAS messages that include ionospheric grid point (IGP) information used by a GUST processor 502 to compute the GEO slant iono delay and compute user iono vertical error (UWE) for the GEO satellite. The UIVE GEO data 504 and GEO slant ionospheric delay data 506 are provided to the L1/L5 bias estimator 414. The L1 control loop 402 provides an estimated L1 iono delay and delay rate information to the bias estimator 414. In addition, the L1 and L5 range filters 408a,b provide status to the bias estimator 414 in the form of L1 filter convergence status and L1 and L5 initial offset compensation status. The L1 and L5 iono filters 406a,b provide status in the form of L1 and L5 iono rate convergence status and L1 iono covariance convergence status.

As shown in FIG. 5, if the GUST is in Primary mode a L1/L5 bias estimate is provided by the L1/L5 bias estimator 414 to the L1 and L5 control loops 402, 404 as follows. If the following conditions are true:

(A)
    (1) Sigma UIVE is smaller than geo_usable_uive (Sigma UIVE threshold);
    (2) Sigma UIVE is smaller or equal to geo_uive_store (previous Sigma UIVE value) plus tolerance;
    (3) L1 range filter converges;
    (4) L1 iono rate and covariance converge;
    (5) L5 iono rate converges;
    (6) L1 initial offset compensation completes; and
    (7) L5 initial offset compensation completes;
        Then do the following
        {
    (1) Compute tau_1115_store (current L1/L5 bias estimate):
            tau_1115_store = − (1 − (L1 frequency^2/L5 frequency^2))*
            (GEO slant iono delay (from 502)
            −estimated L1 iono delay (from 402)
−estimated L1 iono rate (from 402)/2
    (2) Update geo_uive_store:
            geo_uive_store = Sigma UIVE
        }
(B) If tau_1115_store is not zero, then estimate the L1/L5 bias as follows:
    {
    if the absolute value of tau_1115_store is not less than tau_1115_max_step,
        then do the following.
            - If tau_1115_store is larger than tau_1115_max_step, increment
                tau_1115 and decrement tau_1115_store.
    if tau_1115_store is smaller than −tau_1115_max_step, decrement tau_1115 and
increment tau_1115_store.
    (Note that the increment and decrement of tau_1115 are done slowly, one step
(tau_1115_max_step ) at a time.)
    Otherwise, set tau_1115_store to 0.
    }
Tau_1115 is the resultant L1/L5 bias estimate.

The above L1/L5 bias estimation mechanism is set forth below in pseudo code

```
geo_uive_store = initial_geo_uive;
tau_1115 = 0;
tau_1115_store = 0;
(1) if (geo_uive < geo_usable_uive) &
      (geo_uive <= geo_uive_store + tolerance) &.
      (|L1_range_KF_accelrate| < L1_range_KF_accelrate_convergence for
convergence_interval
      seconds consecutively including the current time frame) &
      (|L1_iono_KF_iono_rate| < L1_iono_KF_iono_rate_convergence for
convergence_interval
      seconds consecutively including the current time frame) &
      (|L5_iono_KF_iono_rate| < L5_iono_KF_iono_rate_convergence for
convergence_interval
      seconds consecutively including the current time frame) &
      (L1_iono_KF_p11 < L1_iono_KF_p11_convergence) &
      (L1_init_offset_compensated = = 1) &
      (L5_init_offset_compensated = = 1)
      {
if (time elapsed since GUST becomes Primary mode from cold start is <=
initial_1115_tau_computation_duration + time elapsed during L1 Doppler search
mode + time elapsed during L5 Doppler search mode) or
(time elapsed since GUST becomes Primary mode from switchover is <=
initial_1115_tau_computation_duration + time elapsed during L1 Doppler search
mode + time elapsed during L5 Doppler search mode)
        {
Compute the followings L1/L5 bias parameters every
initial_1115_tau_computation_period
        tau_1115_store = − (1 − (L1_freq^2/L5_freq^2))*(Wiono − X(1) − X(2))/2
        geo_uive_store = geo_uive
        }
if (time elapsed since GUST becomes Primary mode from cold start is larger than
initial_1115_tau_computation_duration + time elapsed during L1 Doppler search
mode + time elapsed during L5 Doppler search mode) or
(time elapsed since GUST becomes Primary mode from switchover is larger than
initial_1115_tau_computation_duration + time elapsed during L1 Doppler search
mode + time elapsed during L5 Doppler search mode)
        {
```

-continued

```
            Compute the followings L1/L5 bias parameters every
            steady_state 1115_tau_computation_period
            tau_1115_store = − (1 − (L1_freq^2/L5_freq^2))*(Wiono −
X(1) − X(2))/2
            geo_uive_store = geo_uive
        }
    }
X(1) is the Kalman filter estimated L1 iono delay
X(2) is the Kalman filter estimated L1 iono rate
geo_uive is the square root of σ_{UIVE, GEO}^2 described in Section A4.4.10 of
RTCA/DO229C. geo_uive is the same as the Sigma UIVE mentioned above.
/* Select the maximum step based on time and mode. */
if (time since the GUST becomes Primary from a cold start is <=
primary_mode_init_period + time elapsed during L1 Doppler search mode + time
elapsed during L5 Doppler search mode)
        tau_1115_max_step = initial_tau_1115_max_step;
else
    tau_1115_max_step = steady_state_tau_1115_max_step;
If (GUST becomes Primary mode from a GUST switchover)
{
if (time elapsed since GUST becomes Primary mode from switchover <=
gust_switch_period + time elapsed during L1 Doppler search mode + time elapsed
during L5 Doppler search mode)
        tau_1115_max_step = gust_switch_tau_1115_max_step;
    else
        tau_1115_max_step = steady_state_tau_1115_max_step;
}
/* Compute L1/L5 bias parameters as follows */
if (GUST is in Primary mode) &
(tau_1115_store is not equal to 0)
{
    if (|tau_1115_store| >= tau_1115_max_step)
    {
    if (tau_1115_store >= tau_1115_max_step)
    {
        tau_1115 = tau_1115 + tau_1115_max_step;
        tau_1115_store = tau_1115_store − tau_1115_max_step;
    }
        else
        {
            tau_1115 = tau_1115 − tau_1115_max_step;
            tau_1115_store = tau_1115_store + tau_1115_max_step;
        }
    }
        else
        {
        tau_1115_store = 0;
        }
}
if (GUST becomes backup mode after a GUST switchover)
{
    Reset the following parameters.
    geo_uive_store = initial_geo_uive;
    tau_1115 = 0;
    tau_1115_store = 0;
}
Note: The following parameters are pre-determined.
initial_geo_uive
geo_usable_uive
L1_range_KF_accelrate_convergence
convergence_interval
L1_iono_KF_iono_rate_convergence
L5_iono_KF_iono_rate_convergence
L1_iono_KF_p11_convergence
initial_1115_tau_computation_duration
initial_1115_tau_computation_period
steady_state 1115_tau_computation_period
primary_mode_init_period
initial_tau_1115_max_step
gust_switch_period
gust_switch_tau_1115_max_step
tolerance
```

Having described exemplary embodiments of the invention, it will now become apparent to one of ordinary skill in the art that other embodiments incorporating their concepts may also be used. Accordingly, the illustrative embodiments contained herein should be limited only by the spirit and scope of the appended claims. All publications and references cited herein are expressly incorporated herein by reference in their entirety.

Other embodiments are within the scope of the following claims.

What is claimed is:

1. A method, comprising:
receiving an estimate of L1 iono delay and L1 iono delay rate;
receiving GEO slant ionospheric delay for a GEO satellite;
receiving user iono vertical error (UIVE) information for the GEO satellite that reflects accuracy of the GEO slant ionospheric delay; and
computing a L1/L5 bias estimate from the estimate of L1 iono delay and L1 iono delay rate and GEO slant ionospheric delay as $$-(1-(L1\ \text{frequency}^2/L5\ \text{frequency}^2))*\ (\text{GEO slant iono delay–estimated}\ L1\ \text{iono delay–estimated}\ L1\ \text{iono delay rate})/2.$$

2. The method according to claim 1, further including iteratively computing the L1/L5 bias estimate and limiting an incremental change to a predetermined amount.

3. The method according to claim 1, further including computing the L1/L5 bias estimate if predetermined conditions are met.

4. The method according to claim 3, wherein the predetermined conditions include one or more of sigma UIVE is smaller than geo usable UIVE, sigma UIVE is smaller or equal to geo UIVE store plus tolerance, L1 range filter converges, L1 iono rate and covariance converge, L5 iono rate converges, L1 initial offset compensation completes, and L5 initial offset compensation completes.

5. The method according to claim 1, further including providing the L1/L5 bias estimate to L1 and L5 control loops.

6. The method according to claim 1, wherein the GEO slant ionosperic delay and the user iono vertical error information for a GEO satellite are computed from ionospheric grid point information.

7. The method according to claim 6, wherein the ionospheric grid point information is received in a WAAS message.

8. The method according to claim 1, further including computing the L1/L5 bias estimate by
if the absolute value of a currently stored L1/L5 bias estimate is not less than a predetermined step value,
then do the following:
if the currently stored L1/L5 bias estimate is larger than the predetermined step value, increment the L1/L5 bias estimate and decrement the currently stored L1/L5 bias estimate;
if the currently stored L1/L5 bias estimate is smaller than the predetermined step value, decrement the L1/L5 bias estimate and increment the currently stored L1/L5 bias estimate;
otherwise, set the currently stored L1/L5 bias estimate to zero.

9. A system, comprising:
an L1 control loop module;
an L5 control loop module coupled to the L1 control loop module;
a L1/L5 bias estimate module coupled to the L1 and L5 control loop modules, the L1/L5 bias estimate module to compute a L1/L5 bias estimate from an estimate of L1 iono delay and L1 iono delay rate and GEO slant ionosperic delay as $$-(1-(L1\ \text{frequency}^2/L5\ \text{frequency}^2))*\ (\text{GEO slant iono delay–estimated}\ L1\ \text{iono delay–estimated}\ L1\ \text{iono delay rate})/2.$$

10. The system according to claim 9, wherein the L1/L5 bias estimate module receives status information from range estimation filters in the L1 and L5 control loop modules.

11. The system according to claim 9, wherein the L1/L5 bias estimate module received status information from iono estimation filters in the L1 and L5 control loop modules.

12. The system according to claim 10, wherein the L1/L5 bias estimate module computes the L1/L5 bias estimate when predetermined conditions are met.

13. The system according to claim 12, wherein the predetermined conditions include one or more of sigma UIVE is smaller than geo usable UIVE, sigma UIVE is smaller or equal to geo uive store plus tolerance, L1 range filter converges, L1 iono rate and covariance converge, L5 iono rate converges, L1 initial offset compensation completes, and L5 initial offset compensation completes.

14. An article, comprising:
a storage medium having stored thereon instructions that when executed by a machine result in the following:
receiving an estimate of L1 iono delay and L1 iono delay rate;
receiving GEO slant ionosperic delay;
receiving user iono vertical error UIVE information for a GEO satellite; and
computing a L1/L5 bias estimate from the estimate of L1 iono delay and L1 iono delay rate and GEO slant ionosperic delay as $$-(1-(L1\ \text{frequency}^2/L5\ \text{frequency}^2))*\ (\text{GEO slant iono delay–estimated}\ L1\ \text{iono delay–estimated}\ L1\ \text{iono delay rate})/2.$$

15. The article according to claim 14, further including instructions for iteratively computing the L1/L5 bias estimate and limiting an incremental change to a predetermined amount.

16. The article according to claim 14, further including computing the L1/L5 bias estimate if predetermined conditions are met, wherein the predetermined conditions include one or more of sigma UIVE is smaller than geo usable UIVE, sigma UIVE is smaller or equal to geo UIVE store plus tolerance, L1 range filter converges, L1 iono rate and covariance converge, L5 iono rate converges, L1 initial offset compensation completes, and L5 initial offset compensation completes.

17. The article according to claim 14, further including providing the L1/L5 bias estimate to L1 and L5 control loops.

18. The article according to claim 14, wherein the GEO slant ionosperic delay and the user iono vertical error information for a GEO satellite are computed from ionospheric grid point information.

* * * * *

UNITED STATES PATENT AND TRADEMARK OFFICE
CERTIFICATE OF CORRECTION

PATENT NO. : 7,532,161 B2
APPLICATION NO. : 11/232575
DATED : May 12, 2009
INVENTOR(S) : Hsu et al.

It is certified that error appears in the above-identified patent and that said Letters Patent is hereby corrected as shown below:

Col. 4, line 59, delete "rage" and replace with -- range --.

Col. 4, line 61, delete "in can be" and replace with -- can be --.

Col. 5, line 6, delete "cock" and replace with -- clock --.

Col. 5, line 11, delete "error" and replace with -- errors --.

Col. 5, line 33, delete "aGfo's" and replace with -- aGfos --.

Col. 6, line 25, delete the entire Eq. 4 and replace with $$W^{-1} = \begin{bmatrix} \sigma_1^2 & 0 & 0 & \cdots & 0 \\ 0 & \sigma_2^2 & 0 & \cdots & 0 \\ 0 & 0 & \sigma_3^2 & \cdots & 0 \\ \vdots & \vdots & \vdots & \ddots & \vdots \\ 0 & 0 & 0 & 0 & \sigma_n^2 \end{bmatrix} \quad \text{Eq. 4}$$

Col. 6, line 51, delete "earth centered earth fixed" and replace with -- earth-centered earth-fixed --.

Col. 7, line 32, delete "(9)." and replace with -- (9): --.

Col. 7, line 48, delete "obtained." and replace with -- obtained: --.

Col. 9, line 13, delete "Doppler's effects" and replace with -- Doppler effect --.

Col. 9, line 41, delete "can not" and replace with -- cannot --.

Col. 9, line 67, delete "second" and replace with -- second. --.

Col. 11, line 29, delete "follows." and replace with -- follows: --.

Col. 11, line 49, delete "rage" and replace with -- range --.

Col. 11, line 60, delete "follows" and replace with -- follows: --.

UNITED STATES PATENT AND TRADEMARK OFFICE
CERTIFICATE OF CORRECTION

PATENT NO. : 7,532,161 B2
APPLICATION NO. : 11/232575
DATED : May 12, 2009
INVENTOR(S) : Hsu et al.

It is certified that error appears in the above-identified patent and that said Letters Patent is hereby corrected as shown below:

Col. 12, line 63, delete "doopler" and replace with -- doppler --.

Col. 13, line 28, delete "pseudorang" and replace with -- pseudorange --.

Col. 13, line 34, delete "follows" and replace with -- follows: --.

Col. 13, line 53, delete "signal" and replace with -- signals --.

Col. 13, line 55, delete "signal" and replace with -- signals --.

Col. 14, line 53, delete "(UWE)" and replace with -- (UIVE) --.

Col. 15, line 15, delete "(from 402)/2" and replace with -- (from 402))/2 --.

Col. 15, line 21, delete "following." and replace with -- following: --.

Col. 15, line 57, delete "followings" and replace with -- following --.

Col. 17, line 4, delete "followings" and replace with -- following --.

Col. 20, line 10, delete "claim 9," and replace with -- claim 10, --.

Col. 20, line 13, delete "claim 10," and replace with -- claim 9, --.

Col. 20, line 55, delete "ionosperic" and replace with -- ionospheric --.

Signed and Sealed this

Eleventh Day of August, 2009

David J. Kappos
*Director of the United States Patent and Trademark Office*